US005690326A

United States Patent [19]

Ballerini et al.

[11] Patent Number: 5,690,326

[45] Date of Patent: Nov. 25, 1997

[54] PICKING-UP DEVICE FOR PHOTOGRAPHIC FILM SHEETS

[75] Inventors: Dario Ballerini, Genoa; Marco Notini, Genova Pegli, both of Italy

[73] Assignee: Minnesota Mining and Manufacturing Company, St. Paul, Minn.

[21] Appl. No.: 633,278

[22] Filed: Apr. 16, 1996

[30] Foreign Application Priority Data

May 12, 1995 [IT] Italy ................................ MI95A0969

[51] Int. Cl.$^6$ ............................ C08K 5/41; B65H 33/04

[52] U.S. Cl. .......................... 271/90; 271/107; 524/172; 524/366; 524/265; 524/266; 524/267; 524/268; 524/269

[58] Field of Search .................... 271/90, 107; 524/172, 524/366, 265, 266, 267, 268, 269

[56] References Cited

U.S. PATENT DOCUMENTS

| | | | |
|---|---|---|---|
| 3,891,205 | 6/1975 | Sunahara et al. | 271/98 |
| 4,505,997 | 3/1985 | Armand et al. | 429/192 |
| 4,506,875 | 3/1985 | Capdebosco et al. | 271/99 |
| 4,514,968 | 5/1985 | Underhill | 56/341 |
| 4,815,721 | 3/1989 | Morgan | 271/3.1 |
| 5,021,308 | 6/1991 | Armand et al. | 429/194 |
| 5,162,177 | 11/1992 | Armand et al. | 429/194 |
| 5,193,796 | 3/1993 | Nagai et al. | 271/90 |
| 5,273,840 | 12/1993 | Dominey | 429/192 |
| 5,348,995 | 9/1994 | Anderson | 524/157 |
| 5,427,365 | 6/1995 | Torisawa | 271/11 |

FOREIGN PATENT DOCUMENTS

| | | |
|---|---|---|
| 0647879 | 4/1995 | European Pat. Off. . |
| 01252141 | 11/1991 | Italy . |

*Primary Examiner*—Peter D. Mulcahy

*Attorney, Agent, or Firm*—Gary L. Griswold; Walter N. Kirn

[57] ABSTRACT

Photographic film sheet picking-up device in a feeding apparatus for feeding such sheets from a station containing at least one sheet to a following station, such as a transport or processing station where the film sheets are to be processed one at a time, wherein such sheet picking-up device comprises rubber suction cups containing at least one antistatic compound selected within the group consisting of a) a metal salt selected within the group consisting of perfluoroalkylsulfonylmethide compounds and perfluoroalkylsulfonylimide compounds, b) a perfluoroalkyl(ene) polyoxyethylene non-ionic type surfactant, c) a modified polyoxyethylenepolysiloxane type surfactant, and a mixture of such compounds.

12 Claims, No Drawings

PICKING-UP DEVICE FOR PHOTOGRAPHIC FILM SHEETS

FIELD OF THE INVENTION

The present invention refers to a picking-up device for photographic film sheets in a sheet feeding apparatus.

BACKGROUND OF THE ART

In photographic film feeding apparatus, single films are to be picked-up from a stack containing at least one sheet and delivered to a following station, such a transporting or processing station, where such film sheets are to be processed one at a time.

Among picking-up devices, vacuum lifters or rubber suction cups are often used to lift the sheet up from the stack, transport it and finally release it when required. To perform this, in a first step the suction cups are connected to a vacuum source (picking-up step), in a second step the suction cups are kept in connection with the vacuum source while the suction cups are moved (transport step) and in a third step the suction cups are disconnected from the vacuum source (release step). The vacuum source is normally a volume kept under reduced pressure by a vacuum pump or by suction due to a constricted section of a Venturi tube, a tube in which air flows at a certain velocity and which is characterized by a constriction in the air flowing section. The suction cups are connected with the vacuum source through a vacuum tube provided with a proper control valve, which performs connections and disconnection of these systems. Examples thereof are shown in U.S. Pat. No. 3,891,205 and 4,506,875.

Picking-up devices using suction cups, although rather complex and expensive, are generally preferred in handling weak or delicate sheets, such as for instance light-sensitive films.

An example of film sheet picking-up device which makes use of simple and cheap suction cups is, for instance, described in Italian Patent Application S.N. MI91A003214.

A problem occurring with the picking-up systems used in light-sensitive film processing apparatus is that of electric static charge formation. In fact, photographic and radiographic silver halide materials generally consist of a support base, which is an electrical insulator, and of photographic layers coated thereon. Such a structure causes the formation and storage of electric static charges, for example when the photographic material upon separation or friction comes in contact with rollers, rods, suction cups and other parts made of rubber, plastic or metal, present at the inside of an automatic processing or an X-ray film handling machine, or upon separation of the surface containing the emulsion from the support base during the film rolling and unrolling steps. These stored static charges cause some drawbacks, the most serious consisting in the discharge of the stored charges prior to development, thus causing the so-called "static marks" phenomenon, which consists in the formation of undesired dots and spots upon development of the photographic film. Such static marks decrease the commercial value of the photographic films, which sometimes result unusable. For example, the formation of static marks in the films to be used in the medical and industrial radiographic field may cause serious evaluation and diagnosis errors. Furthermore, static marks represent a particular problem since they are revealed for the first time only after development of the photographic material and cannot therefore be remedied. These static marks may also give origin to secondary problems, such as that of dust adhesion on the film surface or of non-uniform coatings of the photographic material.

It is an object of the present invention that of giving a contribution to the reduction of static mark formation on the photographic films, in particular those for medical radiography.

SUMMARY OF THE INVENTION

The present invention refers to a photographic film sheet picking-up device in a feeding apparatus from a station containing at least one sheet to a following station, such as a transporting or processing station, where the film sheets are to be processed one at a time, wherein such film sheet picking-up device comprises rubber suction cups containing at least an antistatic compound selected within the group consisting of a) a metal salt selected within the group consisting of perfluoroalkylsulfonylmethide and perfluoroalkylsulfonylimide compounds, b) a perfluoroalkyl(ene) polyoxyethylene non-ionic type surfactant, c) a modified polyoxyethylenepolysiloxane type surfactant, and mixtures thereof.

The picking-up device of the present invention allows the reduction of static mark formation on photographic films, in particular those which are to be used in medical and industrial radiography.

DETAILED DESCRIPTION OF THE INVENTION

The photographic film sheet picking-up device of the present invention is contained in a feeding apparatus which feeds such sheets from a station containing at least one sheet to a following station, such as a transporting or processing station where the film sheets are to be processed one at a time.

In particular, such an apparatus consists of an equipment for an automatic handling of X-ray films which automatically discharges the exposed X-ray film sheet from a light-tight cassette and recharges such light-tight cassette with new unexposed X-ray film, without the need of performing such operations in a dark room to prevent the X-ray film to be undesirably exposed. Such an equipment is for instance described in U.S. Pat. No. 4,514,968. An X-ray film automatic handling apparatus, more in details, consists of: a) means to contain an unexposed X-ray film sheet pile, b) picking-up devices to pick-up a sheet one at a time from said pile, c) means to transport the sheet picked-up form the pile to a light-tight cassette, d) means to expose such X-ray film sheet contained in the cassette, e) devices to pick-up the exposed film sheet from the cassette, f) means to convey the exposed film sheet to the developing, fixing and drying station, g) means to develop, fix and dry the exposed film.

The photographic film sheet picking-up device of the present invention refers to the device described above under item b) to pick-up a sheet one at a time from an unexposed film sheet pile and/or to the device described above under item e) to pick-up the exposed film sheet from a cassette.

The photographic film sheet picking-up device consists of a tube-shaped element provided with at least one element of the suction cup type, preferably of a plurality of suction cup elements positioned along the tube at a proper distance one from another. The plurality of suction cups, generally from two to four, allows the picking-up device to be able to pick-up variable-size film sheets, corresponding to those present on the market. Small-size film sheets require a device with a single suction cup; other film types need at least three suction cups to cover the whole film width and make its picking-up easier.

Preferably, the tube-shaped element is also provided with one or more elements capable of blowing air, preferably two elements positioned near the tube ends, for example along the same axis where the suction cups are placed. Such air-blowing elements facilitate the sheet picking-up performed by the suction cups, since the air blow facilitates the separation of sheet from the cassette containing it or the separation between two sheets in a sheet pile. The suction cups are therefore capable of working properly, thus picking-up one sheet alone at a time.

The suction cups essentially consist of a main cylindrical rigid element and an elastic element around it, for example of circular, elliptical, oval shape, such cylindrical element being provided with an internal longitudinal aspiration element and a ground surface of proper shape (for example with a flat portion and another one inclined towards the film edge) which allows to raise the film to be picked-up.

The diameter of such ground basis of the cylindrical main element is sufficiently large as to create an extraction force higher than the surface adhesion of the under-lying film, in the case of a sheet picked-up from a film sheet pile, or the surface adhesion of the cassette, in the case of a film picked-up from the cassette and depends upon the size of the film itself. In the case of suction cups having a circular-shape elastic element, a useful diameter which fits various is types of X-ray films present on the market is for instance frown about 1 to about 5 centimeters, preferably from about 2 to about 3 centimeters. The diameter of the elastic circular element which can be associated to said main cylindrical element is for example from about 1 to about 10 centimeters, preferably from about 2 to about 6 centimeters.

The suction cups are made of rubber containing at least an antistatic compound selected within the group consisting of a) a metal salt selected within the group consisting of perfluoroalkylsulfonylmethide and perfluoroalkylsulfonylimide compounds, b) a perfluoroalkyl(ene)polyoxyethylene non-ionic type surfactant, c) a modified polyoxyethylenesiloxane type surfactant, and a mixture thereof.

Preferably, the rubber contains as an antistatic compound at least a metal salt selected within the group consisting of perfluoroalkylsulfonylmethide and perfluoroalkylsulfonylimide compounds. More preferably, the rubber contains as antistatic compounds such a metal salt selected within the group consisting of perfluoroalkylsulfonylmethide and perfluoroalkylsulfonylimide compounds, in combination with a perfluoroalkyl(ene)polyoxyethylene non-ionic type surfactant and/or a modified polyoxyethylenepolysiloxane type surfactant.

The perfluoroalkylsulfonylmethide and/or perfluoroalkylsulfonylimide metal salts useful to realize the picking-up devices of the present invention can be represented with the following formula:

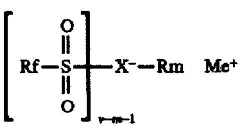

wherein Me is an alkaline metal, Rf is a highly fluorinated alkyl group having from 1 to 12 carbon atoms, X is a nitrogen or carbon atom, R is an alkyl or aryl group, v is the valence of X, m is 0 or 1 when X is a nitrogen atom, and m is 0, 1 or 2 when X is a carbon atom.

The term "highly fluorinated alkyl group" means an alkyl group where at least two hydrogen atoms on each carbon atom of the alkyl chain are substituted with fluorine. Preferably, at least 80% of the hydrogen atoms are substituted with fluorine, more preferably at least 90% and most preferably all hydrogen atoms are substituted with fluorine atoms.

According to the scope of the present invention, when the term "group" is used to describe a chemical compound or substituent, the described chemical material comprises the basic group or that group with conventional substituents.

According to a preferred aspect of the present invention, such metal salt is a perfluoroalkylsulfonylmethide or perfluoroalkylsulfonylimide lithium salt.

According to a preferred embodiment of the present invention, the perfluoroalkylsulfonylmethide or perfluoroalkylsulfonylimide lithium salt useful in the film sheet picking-up device of the present invention may be represented with the following formula:

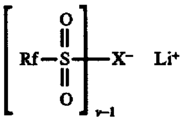

wherein Rf is a highly fluorinated alkyl group having from 1 to 8 carbon atoms, X is a nitrogen or carbon atom and v is the valence of X.

A description of the above described compounds may be found in U.S. Pat. No. 4,505,997; 5,021,308; 5,162,177 and 5,273,840. Examples of perfluoroalkylsulfonylmethide or perfluoroalkylsulfonylimide lithium salts are shown hereinbelow.

1. $F_3C-SO_2-N^{-}-SO_2-CF_3$ $Li^+$

2. 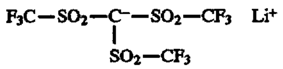

3. $F_5C_2-SO_2-N^{-}-SO_2-CF_3$ $Li^+$

4. 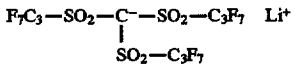

5. 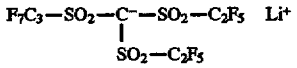

6. $F_7C_3-SO_2-N^{-}-SO_2-C_3F_7$ $Li^+$

7. $F_{11}C_5-SO_2-N^{-}-SO_2-C_6F_{13}$ $Li^+$

8. 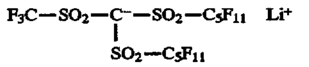

By the term "perfluoroalkyl(ene)polyoxyethylene non-ionic type surfactant" a non-ionic surfactant is meant which comprises a compound mixture consisting of a 6 to 10 carbon atom alkyl or alkylene group where the hydrogen atoms are fully substituted with fluorine atoms bonded to a polyoxyethylene comprising from 6 to 15 oxyethylene groups.

The perfluoroalkyl(ene)polyoxyethylene non-ionic type surfactants may be represented with the following formula:

wherein $R_1$ and $R_2$, are, independently, hydrogen or a low alkyl group having from 1 to 4 carbon atoms, n is an integer from 5 to 16, x is (n+1) or (n−1) and y is a number from 6 to 24.

Particularly useful perfluoroalkyl(ene)polyoxyethylene non-ionic type surfactants are listed hereinbelow.

9. Zonyl ® FSN, a trademark of DuPont Company.

10. $F_{11}C_6-O-(CH_2CH_2O)_8-C_3H_7$

11. $F_{11}C_5-O-(CH_2CH_2O)_{20}-C_2H_5$

12. $F_{17}C_8-O-(CH_2CH_2O)_{16}-C_4H_9$

13. $F_{15}C_8-O-(CH_2CH_2O)_8-CH_3$

14. $F_{25}C_{12}-O-(CH_2CH_2O)_{12}-C_3H_9$

15. $F_{21}C_{10}-O-(CH_2CH_2O)_8-CH_3$

16. $F_{17}C_9-O-(CH_2CH_2O)_{16.3}-CH_3$

The modified polyoxyethylene-polysiloxane type surfactant comprises a non-ionic polysiloxane polymer (preferably having a linear polymer structure) which has pending polyoxyethylene polymer moieties adhered to the polysiloxane structure. The polyoxyethylene chain is preferably bonded to the polysiloxane through ether bonds, and the polyoxyethylene may also contain propylene moieties. The modified polyoxyethylene-polysiloxane type surfactant may be better represented with the following formula:

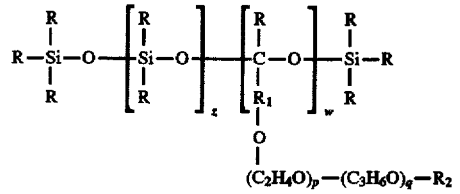

where R is a low alkyl group having from 1 to 4 carbon atoms, $R_1$ is a low alkylene group having from 1 to 4 carbon atoms, $R_2$ is hydrogen or a low alkyl group having from 1 to 4 carbon atoms, z is an integer from 5 to 100, w is an integer from 2 to 50, p is an integer from 5 to 50 and q is an integer from 0 to 50. Compounds of this class are sold for instance by Union Carbide Co, under the name Silwet®. Examples of compounds useful to the purposes of the present invention are:

17. Silwet® L-7605
18. Silwet® L-77
19. Silwet® L-7001

The antistatic compounds are employed in a quantity corresponding to at least 2% by weight of the total rubber weight, preferably at least 5%, more preferably at least 10% by weight of the total rubber weight.

The films for radiographic use to be used in the apparatus containing the film sheet picking-up device of the present invention generally comprise at least a light-sensitive layer, such as a silver halide emulsion layer, coated on at least one side of a support base.

Silver halide emulsions typically comprise silver halide grains which may have different shape and size crystals, such as for example cubical, octahedral, tabular, spherical grains, and the like. Tabular grains are preferred. The tabular silver halide grains contained in the silver halide emulsion layers used to the purposes of the present invention have a diameter:thickness average ratio of at least 3:1, preferably from 3:1 to 20:1 more preferably from 3:1 to 14:1;, most preferably from 3:1 to 8:1. Average diameters of the silver halide tabular grains useful in the present invention range from 0.3 to 5 μm, preferably from 0.5 to 3 μm, most preferably from 0.8 to 1.5 μm. The silver halide tabular grains useful in this invention have a thickness lower than 0.4 μm, preferably lower than 0.3 μm and most preferably lower than 0.2 μm.

Commonly used silver halide grain compositions can be used. Typical silver halides include silver chloride, silver bromide, silver iodide, silver chloroiodide, silver bromoiodide, silver chlorobromoiodide, and the like. Notwithstanding, silver bromide and silver bromoiodide are preferred.

Gelatin is the preferred binder for silver halide emulsions, but also other hydrophilic colloids, alone or in combination, such as dextran, cellulose derivatives and other binders can be used.

The silver halide emulsion layers can be sensitized to a particular wavelength with a sensitizing dye. Typical examples include cyanines, emicyanines, merocyanines, oxonols, and other dyes.

The layers can be coated onto a single side or on both sides of the support base. Examples of materials useful for the support base preparation include glass, paper, metals, polymer films, such as for instance cellulose nitrate, cellulose acetate, polystyrene, polyethylene terephthalate, polyethylene naphthalate, polyethylene, polypropylene, and the like.

The present invention is now illustrated with reference to the following examples.

EXAMPLE 1

Composition 1 (reference)

A 1,500 gram rubber composition was made. Among several components it contained acrylonitrile, zinc oxide, stearic acid and calcium carbonate.

Composition 2 (invention)

Grams 1,350 of composition 1 were added with 150 grams of compound 1 of the present invention, corresponding to 10% by weight of the total weight of the rubber.

Composition 3 (invention)

Grams 1,350 of composition 1 were added with 150 grams of compound 9 of the present invention.

Composition 4 (invention)

Grams 1,350 of composition 1 were added with 150 grams of compound 17 of the present invention.

Composition 5 (invention)

Grams 1,350 of composition 1 were added with 75 grams of compound 1 and 75 grams of compound 9 of the present invention.

Composition 6 (invention)

Grams 1,350 of composition 1 were added with 75 grams of compound 1 and 75 grams of compound 17 of the present invention.

Composition 7 (invention)

Grams 1,350 of composition 1 were added with 75 grams of compound 9 and 75 grams of compound 17 of the present invention.

Composition 8 (invention)

Grams 1,350 of composition 1 were added with 50 grams of compound 1, 50 grams of compound 9 and 50 grams of compound 17 of the present invention.

Composition 9 (comparison)

Grams 1,350 of composition 1 were added with 150 grams of the electro-conductive antistatic compound Zelec®, a trademark of DuPont Co.

Composition 10 (invention)

This composition was prepared as composition 2, but the amount of compound 1 of the present invention corresponded to 3% by weight of the total weight of the rubber.

Composition 11 (invention)

This was prepared as composition 2, but the amount of compound 1 of the present invention corresponded to 6% by weight of the total weight of the rubber.

Composition 12 (invention)

It was prepared as composition 2, but the amount of compound 1 of the present invention corresponded to 12% by weight of the total weight of the rubber.

Composition 13 (invention)

It was prepared as composition 2, but the amount of compound 1 of the present invention corresponded to 15% by weight of the total weight of the rubber.

Compositions 1 to 9 were used to obtain by vulcanization rubber discs (Samples 1 to 9) having a diameter of about 10 cm and a thickness of about 0.5 cm. To measure the surface resistivity, the samples were stored for 18 hours at 21° C. and 25% Relative Humidity. Then, the samples were introduced into a Hewlett Packard "High Resistance Meter" 4329A Model machine interfaced with a Hewlett Packard Model 16008A type resistivity cell and submitted to a 250 volt current for 1 minute. The resistivity of the sample disc surfaces was then measured with such equipment. The lower the value obtained, the better the antistatic protection of the film. Table 1 reports the obtained values. Values lower than $10^7$ $\Omega/cm^2$, which cannot be measured with such equipment, are deemed to be the most favorable to the purposes of the present invention.

TABLE 1

| Sample | Resistivity $\Omega/cm^2$ |
|---|---|
| 1 (reference) | $2.82 \times 10^{10}$ |
| 2 (invention) | $<10^7$ |
| 3 (invention) | $5.26 \times 10^9$ |
| 4 (invention) | $1.22 \times 10^9$ |
| 5 (invention) | $<10^7$ |
| 6 (invention) | $<10^7$ |
| 7 (invention) | $1.03 \times 10^9$ |
| 8 (invention) | $<10^7$ |
| 9 (comparison) | $1.69 \times 10^{10}$ |

Table 1 shows that samples 2 to 8 containing a compound useful to the purposes of the present invention showed a remarkable reduction of surface resistivity, with a consequent improvement of the antistatic properties.

EXAMPLE 2

Compositions 1 to 4 and 10 to 13 were used to obtain by vulcanization rubber suction cups (respectively shown with cups 1–4 and 10–13).

Film A. An X-ray emulsion layer was coated on both sides of a polyester support base at a coverage of 2.15 grams per square meter of silver and 1.5 grams per square meter of gelatin on each side. The emulsion comprised silver bromide grain tabular crystals having a mean diameter of 1.30 μm, a mean thickness of 0.17 μm and an aspect ratio of 7.6, was chemically sensitized with sulfur and gold and optically sensitized to green light.

Film B. A 3M Trimax® XLA type film was used.

A 3M Trimatic® M apparatus was used to process the X-ray films under room conditions of 23° C. and 20% Relative Humidity. An X-ray film cassette containing 3M T8 type 35×43 cm size screens and a sample of Film A was introduced inside said apparatus. A sheet picking-up device containing a suction cup system using suction cups 1 described above was then used for loading and unloading the cassette and a 0.6 bar vacuum was created onto the suction cups. The film A was loaded into and unloaded from the cassette 10 times under red safety light. At the end of such operation, the presence of static marks on Film A was checked.

Some tests were then performed by replacing the suction cups and from time to time using cups 2, 3, 4, 10, 11, 12 and 13. Table 2 reports the results in terms of presence and absence of static marks.

The same tests were carried out with Film B.

TABLE 2

| Suction cups | Film | Static Marks |
|---|---|---|
| 1 (reference) | A | present |
| 2 (invention) | A | absent |
| 3 (invention) | A | absent |
| 4 (invention) | A | absent |
| 10 (invention) | A | absent |
| 11 (invention) | A | absent |
| 12 (invention) | A | absent |
| 13 (invention) | A | absent |
| 1 (reference) | B | present |
| 2 (invention) | B | absent |
| 3 (invention) | B | absent |
| 4 (invention) | B | absent |
| 10 (invention) | B | present |
| 11 (invention) | B | present |
| 12 (invention) | B | absent |
| 13 (invention) | B | absent |

Table 2 shows that Film A processed in an X-ray film automatic processor containing a film sheet picking-up device obtained with the antistatic compounds useful to the purposes of the present invention (suction cups 2 to 4 and 10 to 12) did not show static marks, contrary to the case where the cups did not contain such antistatic compounds (suction cups 1 and 13).

Table 2 also shows that Film B, processed under the same conditions as Film A, shows the presence of static marks when the suction cups had been obtained with an insufficient quantity of the antistatic compound useful to the purposes of the present invention (suction cups 10 and 11).

We claim:

1. A photographic film sheet picking-up device in an apparatus for feeding such film sheets from a station containing at least one sheet to a following station where the film sheets are to be processed one at a time, wherein such film sheet picking-up device comprises suction cups made of rubber containing at least one antistatic compound selected within the group consisting of a) a metal salt selected within the group which consists of perfluoroalkylsulfonylmethide compounds and perfluoroalkylsulfonylimide compounds, b) a non-ionic perfluoroalkyl(ene)polyoxy-ethylene type surfactant, c) a modified polyoxyethylenepoly-siloxane type surfactant, and a mixture of such compounds.

2. The photographic film sheet picking-up device of claim 1, wherein such rubber contains a metal salt selected within the group consisting of perfluoroalkylsulfonylmethide compounds and perfluoroalkylsulfonylimide compounds.

3. The photographic film sheet picking-up device of claim 1, wherein such metal salts are represented by the formula:

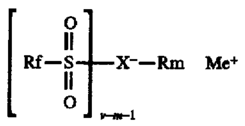

wherein Me is an alkaline metal, Rf is a highly fluorinated alkyl group, X is a nitrogen or carbon atom, R is an alkyl or aryl group, v is the valence of X, m is 0 or 1 when X is a nitrogen atom, and m is 0, 1 or 2 when X is a carbon atom.

4. The photographic film sheet picking-up device of claim 1, wherein such metal salt is selected within the group of lithium perfluoroalkylsulfonylmethide and lithium perfluoroalkylsulfonylimide salts.

5. The photographic film sheet picking-up device of claim 1, wherein such metal salts are represented by the formula:

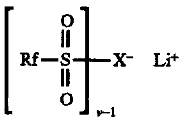

wherein Rf is a highly fluorinated alkyl group, X is a nitrogen or carbon atom and v is the valence of X.

6. The photographic film sheet picking-up device of claim 1, wherein such perfluoroalkyl(ene)polyoxyethylene non-ionic type surfactant is represented by the formula:

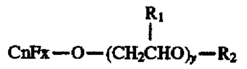

wherein $R_1$ and $R_2$ are, independently, hydrogen or a low alkyl group having from 1 to 4 carbon atoms, n is a positive integer from 5 to 16, x is (n+1) or (n−1) and y is a number from 6 to 24.

7. The photographic film sheet picking-up device of claim 1, wherein such modified polyoxyethylenepolysiloxane type surfactant is represented by the formula:

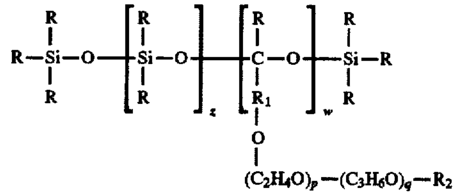

wherein R is a low alkyl group having from 1 to 4 carbon atoms, $R_1$ is a low alkylene group having from 1 to 4 carbon atoms, $R_2$ is hydrogen or a low alkyl group having from 1 to 4 carbon atoms, z is a positive integer from 5 to 100, w is a positive integer from 2 to 50, p is a positive integer from 5 to 50 and q is a positive integer frown 0 to 50.

8. The photographic film sheet picking-up device of claim 2, wherein such rubber also contains a perfluoroalkyl(ene) polyoxy-ethylene non-ionic type surfactant.

9. The photographic film sheet picking-up device of claim 2, wherein such rubber also contains a modified polyoxyethylenepolysiloxane type surfactant.

10. The photographic film sheet picking-up device of claim 1, wherein such antistatic compound is used in a quantity of at least 10% by weight referred to the rubber total weight.

11. The device of claim 1 wherein the robber has a surface resistivity of no more than $5.26\times10^9$ Ω/square centimeter.

12. The device of claim 1 wherein the rubber has a surface resistivity of less than about $10^7$ Ω/square centimeter.

* * * * *

UNITED STATES PATENT AND TRADEMARK OFFICE

CERTIFICATE OF CORRECTION

PATENT NO.: 5,690,326

DATED: November 25, 1997

INVENTOR(S): Dario Ballerini and Marco Notini

It is certified that error appears in the above-identified patent and that said Letters Patent is hereby corrected as shown below:

Column 3, line 23, "various is types" should read --various types--.

Column 3, line 24, "frown" should read --from--.

Column 10, line 28, "frown" should read --from--.

Column 10, line 39, "robber" should read --rubber--.

Signed and Sealed this

Eighteenth Day of May, 1999

Attest:

Q. TODD DICKINSON

Attesting Officer

Acting Commissioner of Patents and Trademarks